(12) United States Patent
Zheng et al.

(10) Patent No.: US 9,554,055 B2
(45) Date of Patent: Jan. 24, 2017

(54) DATA PROCESSING METHOD AND ELECTRONIC DEVICE

(71) Applicants: Beijing Lenovo Software Ltd., Beijing (CN); Lenovo (Beijing) Limited, Beijing (CN)

(72) Inventors: Qizhong Zheng, Beijing (CN); Lihua Li, Beijing (CN); Rui Li, Haidian District (CN); Yigan Zhang, Haidian District (CN)

(73) Assignees: Beijing Lenovo Software Ltd., Beijing (CN); Lenovo (Beijing) Limited, Beijing (CN)

( * ) Notice: Subject to any disclaimer, the term of this patent is extended or adjusted under 35 U.S.C. 154(b) by 0 days.

(21) Appl. No.: 14/742,076

(22) Filed: Jun. 17, 2015

(65) Prior Publication Data

US 2016/0234417 A1     Aug. 11, 2016

(30) Foreign Application Priority Data

Feb. 9, 2015   (CN) .......................... 2015 1 0068010

(51) Int. Cl.
*H04N 5/225* (2006.01)
*H04N 5/235* (2006.01)
*H04N 5/232* (2006.01)

(52) U.S. Cl.
CPC ........ *H04N 5/2353* (2013.01); *H04N 5/23258* (2013.01)

(58) Field of Classification Search
CPC .......................... H04N 5/2353; H04N 5/23258
See application file for complete search history.

(56) References Cited

U.S. PATENT DOCUMENTS

| | | | | |
|---|---|---|---|---|
| 2005/0248660 | A1* | 11/2005 | Stavely | G03B 39/00 348/208.16 |
| 2007/0152161 | A1* | 7/2007 | Olcott | G01T 1/1644 250/363.07 |
| 2009/0128640 | A1* | 5/2009 | Yumiki | G03B 5/02 348/208.6 |

* cited by examiner

*Primary Examiner* — Gary C Vieaux
(74) *Attorney, Agent, or Firm* — Schwegman Lundberg & Woessner, P.A.

(57) ABSTRACT

The present application provides a data processing method and an electronic device. The data processing method comprises: detecting a movement status of the electronic device by a sensor unit; generating a movement parameter of the electronic device based on the movement status; and generating an exposure parameter threshold for an image capture unit of the electronic device based on the movement parameter of the electronic device, such that the image capture unit captures an image with an exposure parameter higher than the exposure parameter threshold.

5 Claims, 8 Drawing Sheets

DATA PROCESSING METHOD AND ELECTRONIC DEVICE

PRIORITY APPLICATIONS

This application claims the benefit under 35 U.S.C. 119 to Chinese Application No. 201510068010.3, filed on 9 Feb. 2015; which application is incorporated herein by reference in its entirety.

TECHNICAL FIELD

The present application relates to data processing technology, and more particularly, to a data processing method and an electronic device.

BACKGROUND

An electronic device equipped with a camera, such as mobile phone and tablet computer, will capture pictures with its lowest shutter value when operating in a dim environment (e.g., at night). During the capturing operation, if the electronic device is moving, even the lowest shutter value could not guarantee the clarity of the captured picture or video.

SUMMARY

A data processing method and an electronic device are provided according to the embodiments of the present application.

According to an embodiment of the present application, a data processing method is provided. The method is applied in an electronic device and comprises: detecting a movement status of the electronic device by a sensor unit; generating a movement parameter of the electronic device based on the movement status; and generating an exposure parameter threshold for an image capture unit of the electronic device based on the movement parameter of the electronic device, such that the image capture unit captures an image with an exposure parameter higher than the exposure parameter threshold.

According to another embodiment of the present application, an electronic device is provided. The electronic device comprises: a sensor unit configured to detect a movement status of the electronic device; a first generating unit configured to generate a movement parameter of the electronic device based on the movement status; and a second generating unit configured to generate an exposure parameter threshold for an image capture unit of the electronic device based on the movement parameter of the electronic device, such that the image capture unit captures an image with an exposure parameter higher than the exposure parameter threshold.

With the embodiments of the present application, an electronic device is provided with a sensor unit capable of detecting a movement status of the electronic device. A corresponding movement parameter, e.g., speed, can be generated based on the movement status and an exposure parameter threshold for an image capture unit of the electronic device can be generated based on the movement parameter. The image capture unit can capture an image with high clarity when its exposure parameter is higher than the exposure parameter threshold. In this way, the clarity of the image captured by the image capture unit in the electronic device can be guaranteed and the usability of the captured image and video can be improved as much as possible.

DETAILED DESCRIPTION OF THE EMBODIMENTS

The embodiments of the present application will be detailed in the following with reference to the figures, such that their characteristics and technical details can be better understood. The figures are illustrative only and are not intended to limit the embodiments of the present application.

Figure 1:
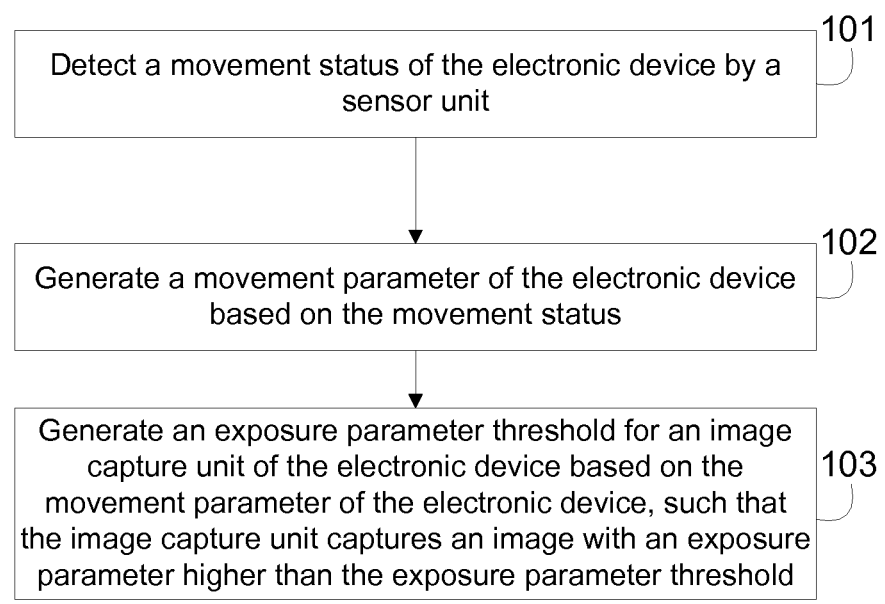
FIG. 1 is a flowchart illustrating a data processing method according to a first embodiment of the present application.

FIG. 1 is a flowchart illustrating a data processing method according to a first embodiment of the present application. The data processing method is applied in an electronic device. As shown in FIG. 1, the data processing method includes the following steps.

At step 101, a movement status of the electronic device is detected by a sensor unit.

In this embodiment, the electronic device may be a mobile phone or a tablet computer. Such electronic device has an image capture unit, such as a camera, that can capture an image of a subject. The electronic device is generally used in a hand held manner. Since the hand may shake, which will blur the image, a lowest shutter value is typically set for the electronic device to automatically determine the shutter for capturing the image. For example, a mobile phone typically uses $\frac{1}{17}$ as its lowest shutter value. When there is no enough ambient light around the electronic device, the image capture unit of the electronic device will capture a picture with the lowest shutter value, so as to guarantee the clarity of the captured image while the electronic device is being hand held.

If the electronic device is moving while the image capture unit is capturing an image, e.g., when the image capture unit is an automobile data recorder or when the electronic device is hand held by a user sitting on a fast moving vehicle, even the lowest shutter value could not guarantee the clarity of the captured image or video. Hence, it would be desired to acquire the current moving speed of the electronic device, so as to automatically adjust the lowest shutter value of the image capture unit, thereby ensuring the clarity of the image or video captured by the image capture unit. In this way, the usability of the captured image or video can be improved as much as possible. Thus, the electronic device in an embodiment is provided with a sensor unit, e.g., a Global Positioning System (GPS) unit, capable of detecting a movement status, e.g., moving speed, of the electronic device.

At step 102, a movement parameter of the electronic device is generated based on the movement status.

In an embodiment, the sensor unit, e.g., GPS unit, can calculate the speed value of the electronic device based on positional data of two locations and time difference between the two locations. This speed value can be the movement parameter of the electronic device. At present, the GPS-based speed measurement can have an accuracy of 0.2 m/s.

At step 103, an exposure parameter threshold for an image capture unit of the electronic device is generated based on the movement parameter of the electronic device, such that the image capture unit can capture an image with an exposure parameter higher than the exposure parameter threshold.

In an embodiment, the exposure parameter threshold can be associated with e.g., shutter speed or aperture. Here, the amount of light entering into the lens of the image capture unit is dependent on the aperture.

In an embodiment, when the movement parameter of the electronic device indicates that a moving speed of the electronic device increases, the exposure parameter threshold for the image capture unit of the electronic device can be decreased. For example, the lowest shutter parameter of the image capture unit can be decreased, the shutter speed can be enhanced.

Figure 11:
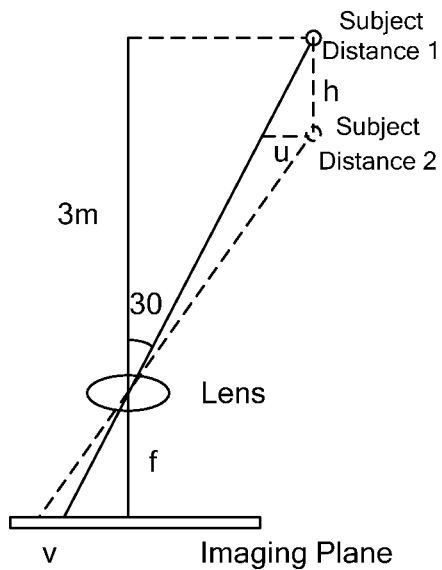
FIG. 11 is a schematic diagram showing a principle of the present application.

In particular, as shown in FIG. 11, it is assumed that the size of a single pixel is 1.4 um, a focal length of the lens is 4 mm, the distance between the subject and the observation point is H=3M, and the subject is in a direction of 30 degrees. In this case, the distance the subject is allowed to move during the exposure, i.e., the distance between a subject distance 2 and a subject distance 1, h, can be calculated as follows.

As shown in FIG. 11, it is assumed that a range of 40 pixels is clearly visible to human eyes. Then, the imaging moving distance is v=1.4 um×40=56 um. Since the moving distance allowable between the subject distance 2 and the subject distance 1 is relatively short, the following applies: v/f=u/H, i.e., u=vH/f=56 um*3 m/3 mm=0.056 m. That is, during the imaging process, the subject is allowed to move h=0.056 m in the direction of 30 degrees.

It is assumed that the adjusted owest shutter value is t=u/s and the travelling speed of the vehicle is s=80 km/h=22.2 m/s, then t=u/s=0.056/22.2=0.00252 s=1/400s. That is, the lowest shutter value is 1/400 at the speed of 80 km/h. Similarly, the lowest shutter value is 1/500s at the speed of 100 km/h and 1/100s at the speed of 20 km/h.

When the movement parameter of the electronic device indicates that a moving speed of the electronic device decreases, the exposure parameter threshold for the image capture unit of the electronic device can be increased. For example, the lowest shutter parameter of the image capture unit can be increased, the shutter speed can be decreased. Accordingly, the image capture unit captures an image with an exposure parameter higher than the exposure parameter threshold. In this way, the clarity of the image captured by the image capture unit can be guaranteed and the usability of the captured image and video can be improved as much as possible.

In an embodiment, when the electronic device is recording a video while it is moving, it is guaranteed that the shutter value of each frame of the video is not lower than the adjusted lowest shutter value. Hence, during the subsequent playback of the video, an image having a guaranteed clarity can be obtained simply by pausing to take a snapshot.

Figure 2:
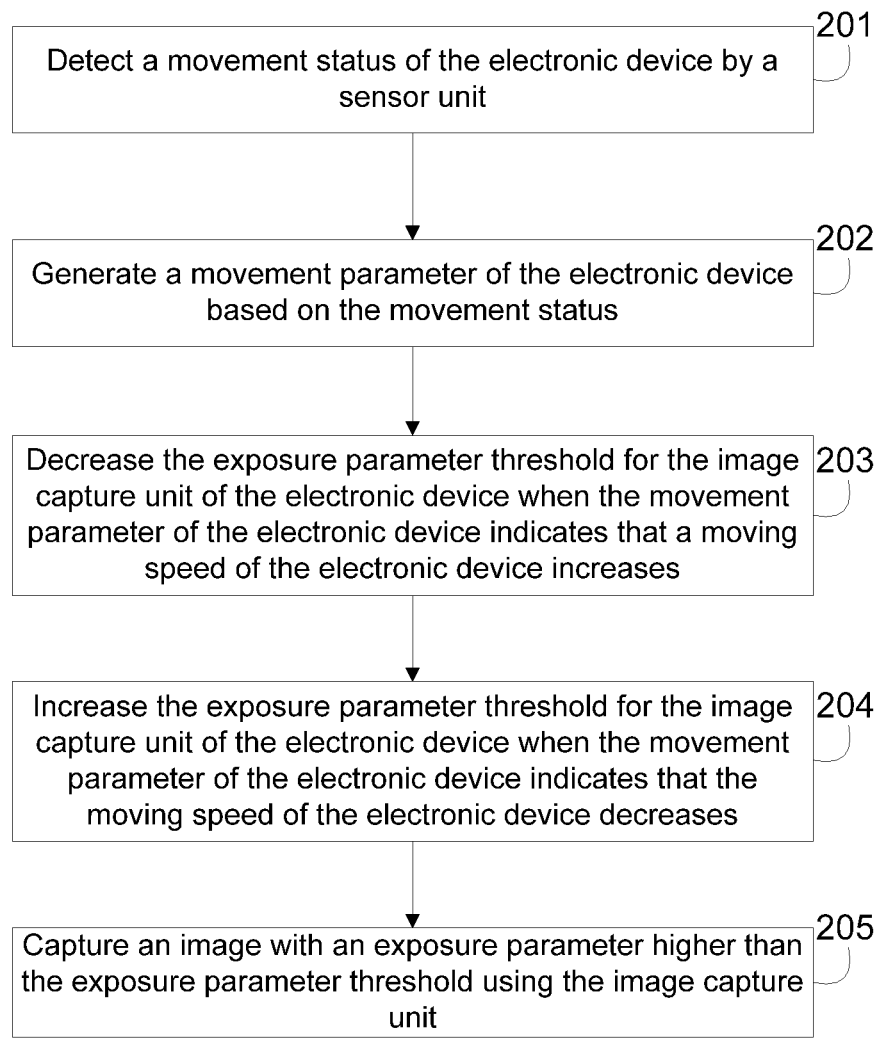
FIG. 2 is a flowchart illustrating a data processing method according to a second embodiment of the present application.

FIG. 2 is a flowchart illustrating a data processing method according to a second embodiment of the present application. The data processing method is applied in an electronic device. As shown in FIG. 2, the data processing method includes the following steps.

At step 201, a movement status of the electronic device is detected by a sensor unit.

In this embodiment, the electronic device may be a mobile phone or a tablet computer. Such electronic device has an image capture unit, such as a camera, that can capture an image of a subject. The electronic device is generally used in a hand held manner. Since the hand may shake, which will blur the image, a lowest shutter value is typically set for the electronic device to automatically determine the shutter for capturing the image. For example, a mobile phone typically uses 1/17 as its lowest shutter value. When there is no enough ambient light around the electronic device, the image capture unit of the electronic device will capture a picture with the lowest shutter value, so as to guarantee the clarity of the captured image while the electronic device is being hand held.

If the electronic device is moving while the image capture unit is capturing an image, e.g., when the image capture unit is an automobile data recorder or when the electronic device is hand held by a user sitting on a fast moving vehicle, even the lowest shutter value could not guarantee the clarity of the captured image or video. Hence, it would be desired to acquire the current moving speed of the electronic device, so as to automatically adjust the lowest shutter value of the image capture unit, thereby ensuring the clarity of the image or video captured by the image capture unit. In this way, the usability of the captured image or video can be improved as much as possible. Thus, the electronic device in an embodiment is provided with a sensor unit, e.g., a GPS unit, capable of detecting a movement status, e.g., moving speed, of the electronic device.

At step 202, a movement parameter of the electronic device is generated based on the movement status.

In an embodiment, the sensor unit, e.g., GPS unit, can calculate the speed value of the electronic device based on positional data of two locations and time difference between the two locations. This speed value can be the movement parameter of the electronic device. At present, the GPS-based speed measurement can have an accuracy of 0.2 m/s.

At step 203, when the movement parameter of the electronic device indicates that a moving speed of the electronic device increases, an exposure parameter threshold for the image capture unit of the electronic device is decreased.

In an embodiment, the exposure parameter threshold can be associated with e.g., shutter speed or aperture. Here, the amount of light entering into the lens of the image capture unit is dependent on the aperture.

In an embodiment, when the movement parameter of the electronic device indicates that a moving speed of the electronic device increases, the exposure parameter threshold for the image capture unit of the electronic device can be decreased. For example, the lowest shutter parameter of the image capture unit can be decreased, the shutter speed can be enhanced.

At step 204, when the movement parameter of the electronic device indicates that the moving speed of the electronic device decreases, the exposure parameter threshold for the image capture unit of the electronic device is increased.

In particular, as shown in FIG. 11, it is assumed that the size of a single pixel is 1.4 um, a focal length of the lens is 4 mm, the distance between the subject and the observation point is H=3M, and the subject is in a direction of 30 degrees. In this case, the distance the subject is allowed to move during the exposure, i.e., the distance between a subject distance 2 and a subject distance 1, h, can be calculated as follows.

As shown in FIG. 11, it is assumed that a range of 40 pixels is clearly visible to human eyes. Then, the imaging moving distance is v=1.4 um×40=56 um. Since the moving distance allowable between the subject distance 2 and the subject distance 1 is relatively short, the following applies: v/f=u/H, i.e., u=vH/f=56 um*3 m/3 mm=0.056 m. That is, during the imaging process, the subject is allowed to move h=0.056 m in the direction of 30 degrees.

It is assumed that the adjusted owest shutter value is t=u/s and the travelling speed of the vehicle is s=80 km/h=22.2 m/s, then t=u/s=0.056/22.2=0.00252 s=1/400s. That is, the lowest shutter value is 1/400 at the speed of 80 km/h. Similarly, the lowest shutter value is 1/500s at the speed of 200 km/h and 1/200s at the speed of 20 km/h.

At step 205, the image capture unit captures an image with an exposure parameter higher than the exposure parameter threshold.

In an embodiment, when the electronic device is recording a video while it is moving, it is guaranteed that the shutter value of each frame of the video is not lower than the adjusted lowest shutter value. Hence, during the subsequent playback of the video, an image having a guaranteed clarity can be obtained simply by pausing to take a snapshot.

Figure 3:
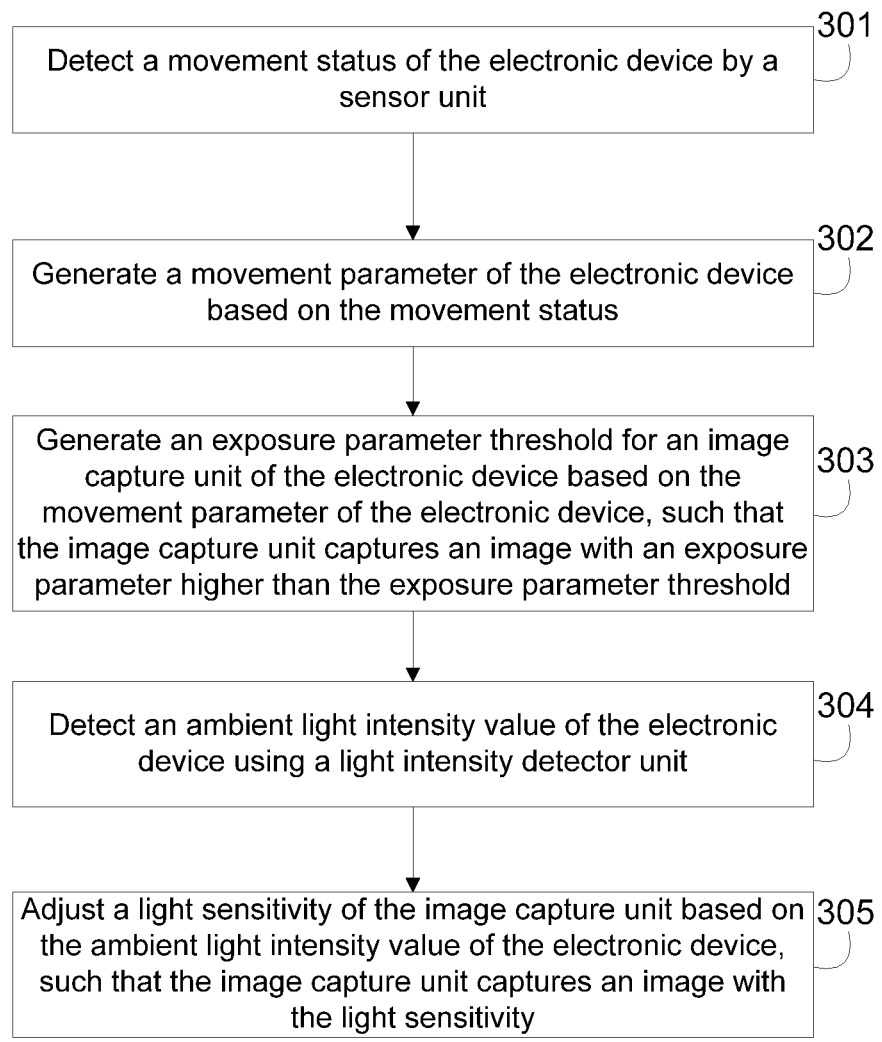
FIG. 3 is a flowchart illustrating a data processing method according to a third embodiment of the present application.

FIG. 3 is a flowchart illustrating a data processing method according to a third embodiment of the present application. The data processing method is applied in an electronic device. As shown in FIG. 3, the data processing method includes the following steps.

At step 301, a movement status of the electronic device is detected by a sensor unit.

In this embodiment, the electronic device may be a mobile phone or a tablet computer. Such electronic device has an image capture unit, such as a camera, that can capture an image of a subject. The electronic device is generally used in a hand held manner. Since the hand may shake, which will blur the image, a lowest shutter value is typically set for the electronic device to automatically determine the shutter for capturing the image. For example, a mobile phone typically uses 1/17 as its lowest shutter value. When there is no enough ambient light around the electronic device, the image capture unit of the electronic device will capture a picture with the lowest shutter value, so as to guarantee the clarity of the captured image while the electronic device is being hand held.

If the electronic device is moving while the image capture unit is capturing an image, e.g., when the image capture unit is an automobile data recorder or when the electronic device is hand held by a user sitting on a fast moving vehicle, even the lowest shutter value could not guarantee the clarity of the captured image or video. Hence, it would be desired to acquire the current moving speed of the electronic device, so as to automatically adjust the lowest shutter value of the image capture unit, thereby ensuring the clarity of the image or video captured by the image capture unit. In this way, the usability of the captured image or video can be improved as much as possible. Thus, the electronic device in an embodiment is provided with a sensor unit, e.g., a GPS unit, capable of detecting a movement status, e.g., moving speed, of the electronic device.

At step 302, a movement parameter of the electronic device is generated based on the movement status.

In an embodiment, the sensor unit, e.g., GPS unit, can calculate the speed value of the electronic device based on positional data of two locations and time difference between the two locations. This speed value can be the movement parameter of the electronic device. At present, the GPS-based speed measurement can have an accuracy of 0.2 m/s.

At step 303, an exposure parameter threshold for an image capture unit of the electronic device is generated based on the movement parameter of the electronic device, such that the image capture unit can capture an image with an exposure parameter higher than the exposure parameter threshold.

In an embodiment, the exposure parameter threshold can be associated with e.g., shutter speed or aperture. Here, the amount of light entering into the lens of the image capture unit is dependent on the aperture.

In an embodiment, when the movement parameter of the electronic device indicates that a moving speed of the electronic device increases, the exposure parameter threshold for the image capture unit of the electronic device can be decreased. For example, the lowest shutter parameter of the image capture unit can be decreased, the shutter speed can be enhanced.

In particular, as shown in FIG. 11, it is assumed that the size of a single pixel is 1.4 um, a focal length of the lens is 4 mm, the distance between the subject and the observation point is H=3M, and the subject is in a direction of 30 degrees. In this case, the distance the subject is allowed to move during the exposure, i.e., the distance between a subject distance 2 and a subject distance 1, h, can be calculated as follows.

As shown in FIG. 11, it is assumed that a range of 40 pixels is clearly visible to human eyes. Then, the imaging moving distance is v=1.4 um×40=56 um. Since the moving distance allowable between the subject distance 2 and the subject distance 1 is relatively short, the following applies: v/f=u/H, i.e., u=vH/f=56 um*3 m/3 mm=0.056 m. That is, during the imaging process, the subject is allowed to move h=0.056 m in the direction of 30 degrees.

It is assumed that the adjusted lowest shutter value is t=u/s and the travelling speed of the vehicle is s=80 km/h=22.2 m/s, then t=u/s=0.056/22.2=0.00252 s=1/400s. That is, the lowest shutter value is 1/400 at the speed of 80 km/h. Similarly, the lowest shutter value is 1/500s at the speed of 300 km/h and 1/300s at the speed of 20 km/h.

When the movement parameter of the electronic device indicates that a moving speed of the electronic device decreases, the exposure parameter threshold for the image capture unit of the electronic device can be increased. For example, the lowest shutter parameter of the image capture unit can be increased, the shutter speed can be decreased. Accordingly, the image capture unit captures an image with an exposure parameter higher than the exposure parameter threshold. In this way, the clarity of the image captured by the image capture unit can be guaranteed and the usability of the captured image and video can be improved as much as possible.

In an embodiment, when the electronic device is recording a video while it is moving, it is guaranteed that the shutter value of each frame of the video is not lower than the adjusted lowest shutter value. Hence, during the subsequent playback of the video, an image having a guaranteed clarity can be obtained simply by pausing to take a snapshot.

At step 304, an ambient light intensity value of the electronic device is detected using a light intensity detector unit.

In an embodiment, the electronic device is further provided with a light intensity detector unit, such as a photosensitive element, capable of detecting an ambient light intensity value of the electronic device. Here, the ambient light intensity value of the electronic device indicates the brightness of the environment where the electronic device is located. The higher the light intensity value is, the brighter the environment, or vice versa.

At step 305, a light sensitivity of the image capture unit is adjusted based on the ambient light intensity value of the electronic device, such that the image capture unit captures an image with the light sensitivity.

In an embodiment of the present application, the amount of light entering into the lens of the image capture unit is dependent on the aperture. The light sensitivity of the image capture unit is adjusted by adjusting the amount of the light entering into the lens via the aperture. Given a lowest shutter of the image capture unit, once the light is not enough, the light sensitivity of the image capture unit can be increased to achieve a sufficient exposure, so as to guarantee the brightness of the image.

Figure 4:
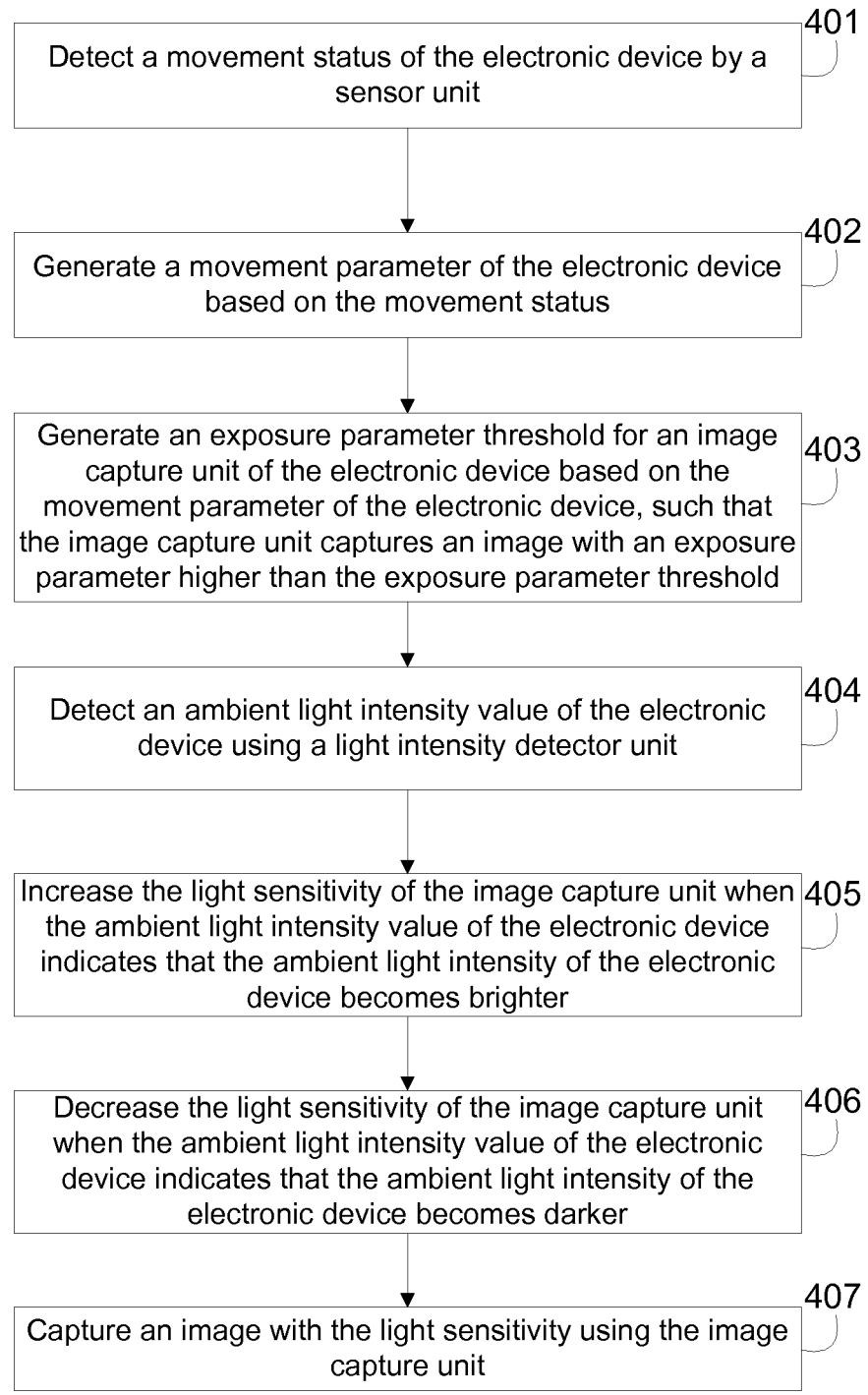
FIG. 4 is a flowchart illustrating a data processing method according to a fourth embodiment of the present application.

FIG. 4 is a flowchart illustrating a data processing method according to a fourth embodiment of the present application. The data processing method is applied in an electronic device. As shown in FIG. 4, the data processing method includes the following steps.

At step 401, a movement status of the electronic device is detected by a sensor unit.

In this embodiment, the electronic device may be a mobile phone or a tablet computer. Such electronic device has an image capture unit, such as a camera, that can capture an image of a subject. The electronic device is generally used in a hand held manner. Since the hand may shake, which will blur the image, a lowest shutter value is typically set for the electronic device to automatically determine the shutter for capturing the image. For example, a mobile phone typically uses $1/17$ as its lowest shutter value. When there is no enough ambient light around the electronic device, the image capture unit of the electronic device will capture a picture with the lowest shutter value, so as to guarantee the clarity of the captured image while the electronic device is being hand held.

If the electronic device is moving while the image capture unit is capturing an image, e.g., when the image capture unit is an automobile data recorder or when the electronic device is hand held by a user sitting on a fast moving vehicle, even the lowest shutter value could not guarantee the clarity of the captured image or video. Hence, it would be desired to acquire the current moving speed of the electronic device, so as to automatically adjust the lowest shutter value of the image capture unit, thereby ensuring the clarity of the image or video captured by the image capture unit. In this way, the usability of the captured image or video can be improved as much as possible. Thus, the electronic device in an embodiment is provided with a sensor unit, e.g., a GPS unit, capable of detecting a movement status, e.g., moving speed, of the electronic device.

At step 402, a movement parameter of the electronic device is generated based on the movement status.

In an embodiment, the sensor unit, e.g., GPS unit, can calculate the speed value of the electronic device based on positional data of two locations and time difference between the two locations. This speed value can be the movement parameter of the electronic device. At present, the GPS-based speed measurement can have an accuracy of 0.2 m/s.

At step 403, an exposure parameter threshold for an image capture unit of the electronic device is generated based on the movement parameter of the electronic device, such that the image capture unit can capture an image with an exposure parameter higher than the exposure parameter threshold.

In an embodiment, the exposure parameter threshold can be associated with e.g., shutter speed or aperture. Here, the amount of light entering into the lens of the image capture unit is dependent on the aperture.

In an embodiment, when the movement parameter of the electronic device indicates that a moving speed of the electronic device increases, the exposure parameter threshold for the image capture unit of the electronic device can be decreased. For example, the lowest shutter parameter of the image capture unit can be decreased, the shutter speed can be enhanced.

In particular, as shown in FIG. 11, it is assumed that the size of a single pixel is 1.4 um, a focal length of the lens is 4 mm, the distance between the subject and the observation point is H=3M, and the subject is in a direction of 30 degrees. In this case, the distance the subject is allowed to move during the exposure, i.e., the distance between a subject distance 2 and a subject distance 1, h, can be calculated as follows.

As shown in FIG. 11, it is assumed that a range of 40 pixels is clearly visible to human eyes. Then, the imaging moving distance is v=1.4 um×40=56 um. Since the moving distance allowable between the subject distance 2 and the subject distance 1 is relatively short, the following applies: v/f=u/H, i.e., u=vH/f=56 um*3 m/3 mm=0.056 m. That is, during the imaging process, the subject is allowed to move h=0.056 m in the direction of 40 degrees.

It is assumed that the adjusted owest shutter value is t=u/s and the travelling speed of the vehicle is s=80 km/h=22.2 m/s, then t=u/s=0.056/22.2=0.00252 s=$1/400$s. That is, the lowest shutter value is $1/400$ at the speed of 80 km/h. Similarly, the lowest shutter value is $1/500$s at the speed of 400 km/h and $1/400$s at the speed of 20 km/h.

When the movement parameter of the electronic device indicates that a moving speed of the electronic device decreases, the exposure parameter threshold for the image capture unit of the electronic device can be increased. For example, the lowest shutter parameter of the image capture unit can be increased, the shutter speed can be decreased. Accordingly, the image capture unit captures an image with an exposure parameter higher than the exposure parameter threshold. In this way, the clarity of the image captured by the image capture unit can be guaranteed and the usability of the captured image and video can be improved as much as possible.

In an embodiment, when the electronic device is recording a video while it is moving, it is guaranteed that the shutter value of each frame of the video is not lower than the adjusted lowest shutter value. Hence, during the subsequent playback of the video, an image having a guaranteed clarity can be obtained simply by pausing to take a snapshot.

At step 404, an ambient light intensity value of the electronic device is detected using a light intensity detector unit.

In an embodiment, the electronic device is further provided with a light intensity detector unit, such as a photosensitive element, capable of detecting an ambient light intensity value of the electronic device. Here, the ambient light intensity value of the electronic device indicates the brightness of the environment where the electronic device is located. The higher the light intensity value is, the brighter the environment, or vice versa.

At step 405, when the ambient light intensity value of the electronic device indicates that the ambient light intensity of the electronic device becomes brighter, the light sensitivity of the image capture unit is increased.

At step 406, when the ambient light intensity value of the electronic device indicates that the ambient light intensity of the electronic device becomes darker, the light sensitivity of the image capture unit is decreased.

At step 407, the image capture unit captures an image with the light sensitivity.

In an embodiment of the present application, the amount of light entering into the lens of the image capture unit is dependent on the aperture. The light sensitivity of the image capture unit is adjusted by adjusting the amount of the light entering into the lens via the aperture. Given a lowest shutter of the image capture unit, once the light is not enough, the light sensitivity of the image capture unit can be increased to achieve a sufficient exposure, so as to guarantee the brightness of the image.

Figure 5:
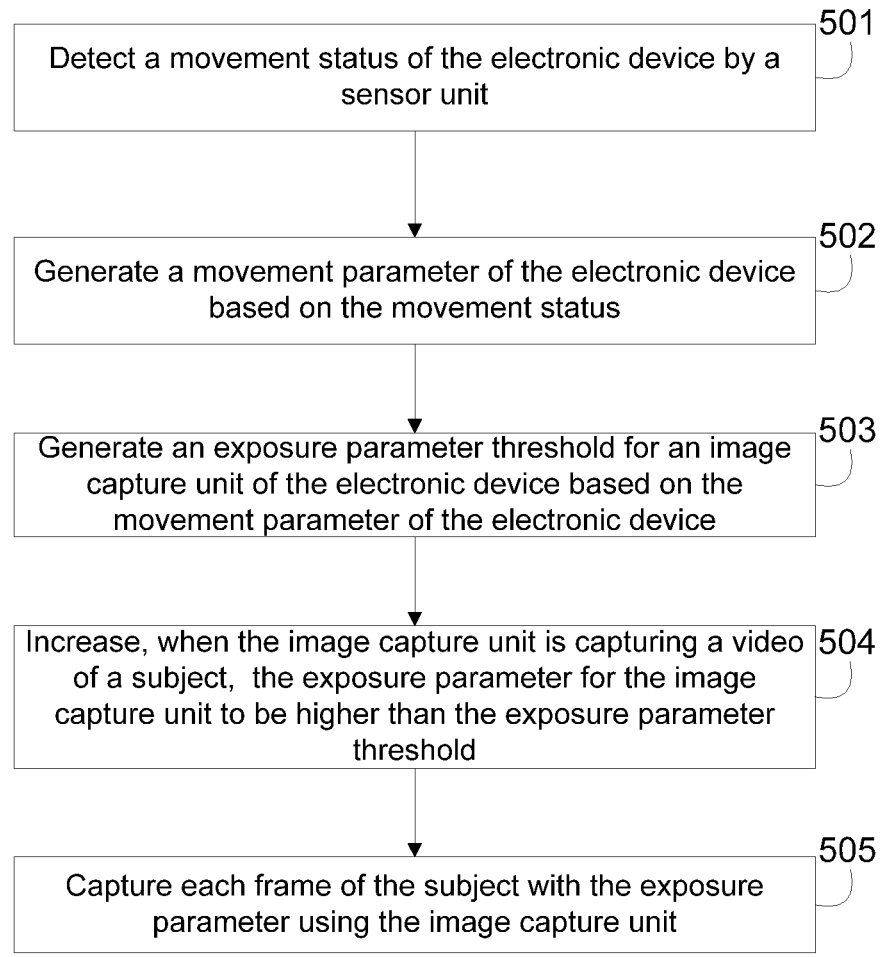
FIG. 5 is a flowchart illustrating a data processing method according to a fifth embodiment of the present application.

FIG. 5 is a flowchart illustrating a data processing method according to a fifth embodiment of the present application. The data processing method is applied in an electronic device. As shown in FIG. 5, the data processing method includes the following steps.

At step 501, a movement status of the electronic device is detected by a sensor unit.

In this embodiment, the electronic device may be a mobile phone or a tablet computer. Such electronic device has an image capture unit, such as a camera, that can capture an image of a subject. The electronic device is generally used in a hand held manner. Since the hand may shake, which will blur the image, a lowest shutter value is typically set for the electronic device to automatically determine the shutter for capturing the image. For example, a mobile phone typically uses $1/17$ as its lowest shutter value. When there is no enough ambient light around the electronic device, the image capture unit of the electronic device will capture a picture with the lowest shutter value, so as to guarantee the clarity of the captured image while the electronic device is being hand held.

If the electronic device is moving while the image capture unit is capturing an image, e.g., when the image capture unit is an automobile data recorder or when the electronic device is hand held by a user sitting on a fast moving vehicle, even the lowest shutter value could not guarantee the clarity of the captured image or video. Hence, it would be desired to acquire the current moving speed of the electronic device, so as to automatically adjust the lowest shutter value of the image capture unit, thereby ensuring the clarity of the image or video captured by the image capture unit. In this way, the usability of the captured image or video can be improved as much as possible. Thus, the electronic device in an embodiment is provided with a sensor unit, e.g., a GPS unit, capable of detecting a movement status, e.g., moving speed, of the electronic device.

At step 502, a movement parameter of the electronic device is generated based on the movement status.

In an embodiment, the sensor unit, e.g., GPS unit, can calculate the speed value of the electronic device based on positional data of two locations and time difference between the two locations. This speed value can be the movement parameter of the electronic device. At present, the GPS-based speed measurement can have an accuracy of 0.2 m/s.

At step 503, an exposure parameter threshold for an image capture unit of the electronic device is generated based on the movement parameter of the electronic device.

In an embodiment, the exposure parameter threshold can be associated with e.g., shutter speed or aperture. Here, the amount of light entering into the lens of the image capture unit is dependent on the aperture.

In an embodiment, when the movement parameter of the electronic device indicates that a moving speed of the electronic device increases, the exposure parameter threshold for the image capture unit of the electronic device can be decreased. For example, the lowest shutter parameter of the image capture unit can be decreased, the shutter speed can be enhanced.

In particular, as shown in FIG. 11, it is assumed that the size of a single pixel is 1.4 um, a focal length of the lens is 4 mm, the distance between the subject and the observation point is H=3M, and the subject is in a direction of 30 degrees. In this case, the distance the subject is allowed to move during the exposure, i.e., the distance between a subject distance 2 and a subject distance 1, h, can be calculated as follows.

As shown in FIG. 11, it is assumed that a range of 40 pixels is clearly visible to human eyes. Then, the imaging moving distance is v=1.4 um×40=56 um. Since the moving distance allowable between the subject distance 2 and the subject distance 1 is relatively short, the following applies: v/f=u/H, i.e., u=vH/f=56 um*3 m/3 mm=0.056 m. That is, during the imaging process, the subject is allowed to move h=0.056 m in the direction of 30 degrees.

It is assumed that the adjusted lowest shutter value is t=u/s and the travelling speed of the vehicle is s=80 km/h=22.2 m/s, then t=u/s=0.056/22.2=0.00252 s=$1/400$s. That is, the lowest shutter value is $1/400$ at the speed of 80 km/h. Similarly, the lowest shutter value is $1/500$s at the speed of 500 km/h and $1/500$s at the speed of 20 km/h.

When the movement parameter of the electronic device indicates that a moving speed of the electronic device decreases, the exposure parameter threshold for the image capture unit of the electronic device can be increased. For example, the lowest shutter parameter of the image capture unit can be increased, the shutter speed can be decreased. Accordingly, the image capture unit captures an image with an exposure parameter higher than the exposure parameter threshold. In this way, the clarity of the image captured by the image capture unit can be guaranteed and the usability of the captured image and video can be improved as much as possible.

At step 504, when the image capture unit is capturing a video of a subject, the exposure parameter for the image capture unit is increased to be higher than the exposure parameter threshold.

At step 505, each frame of the subject is captured with the exposure parameter using the image capture unit.

In an embodiment, when the electronic device is recording a video while it is moving, it is guaranteed that the shutter value of each frame of the video is not lower than the adjusted lowest shutter value. Hence, during the subsequent playback of the video, an image having a guaranteed clarity can be obtained simply by pausing to take a snapshot.

Figure 6:
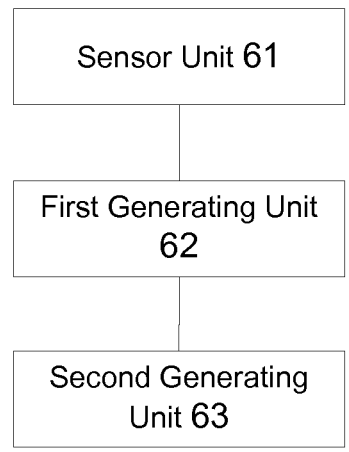
FIG. 6 is a block diagram showing a structure of an electronic device according to a first embodiment of the present application.

FIG. 6 is a block diagram showing a structure of an electronic device according to a first embodiment of the present application. The electronic device includes the following units.

A sensor unit 61 is configured to detect a movement status of the electronic device.

A first generating unit 62 is configured to generate a movement parameter of the electronic device based on the movement status.

A second generating unit 63 is configured to generate an exposure parameter threshold for an image capture unit of the electronic device based on the movement parameter of the electronic device, such that the image capture unit captures an image with an exposure parameter higher than the exposure parameter threshold.

It can be appreciated by those skilled in the art that the functions implemented by the respective units of the electronic device can be understood by referring to the description associated with the above data processing method. The functions of the respective units of the electronic device can be implemented with programs running on a processor or with specific logic circuits.

Figure 7:
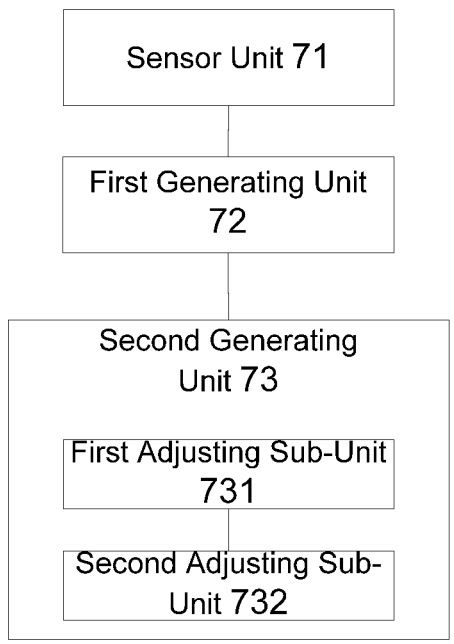
FIG. 7 is a block diagram showing a structure of an electronic device according to a second embodiment of the present application.

FIG. 7 is a block diagram showing a structure of an electronic device according to a second embodiment of the present application. The electronic device includes the following units.

A sensor unit 71 is configured to detect a movement status of the electronic device.

A first generating unit 72 is configured to generate a movement parameter of the electronic device based on the movement status.

A second generating unit 73 is configured to generate an exposure parameter threshold for an image capture unit of the electronic device based on the movement parameter of the electronic device, such that the image capture unit captures an image with an exposure parameter higher than the exposure parameter threshold.

Preferably, the second generating unit 73 includes a first adjusting sub-unit 731 configured to decrease the exposure parameter threshold for the image capture unit of the electronic device when the movement parameter of the electronic device indicates that a moving speed of the electronic device increases; and a second adjusting sub-unit 732 configured to increase the exposure parameter threshold for the image capture unit of the electronic device when the movement parameter of the electronic device indicates that the moving speed of the electronic device decreases.

It can be appreciated by those skilled in the art that the functions implemented by the respective units of the electronic device can be understood by referring to the description associated with the above data processing method. The functions of the respective units of the electronic device can be implemented with programs running on a processor or with specific logic circuits.

Figure 8:
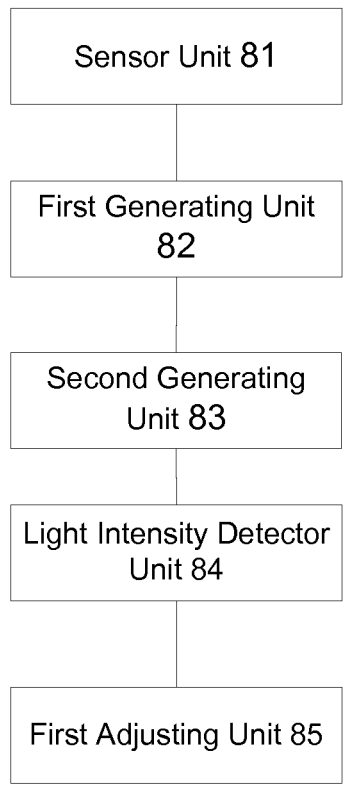
FIG. 8 is a block diagram showing a structure of an electronic device according to a third embodiment of the present application.

FIG. 8 is a block diagram showing a structure of an electronic device according to a third embodiment of the present application. The electronic device includes the following units.

A sensor unit 81 is configured to detect a movement status of the electronic device.

A first generating unit 82 is configured to generate a movement parameter of the electronic device based on the movement status.

A second generating unit 83 is configured to generate an exposure parameter threshold for an image capture unit of the electronic device based on the movement parameter of the electronic device, such that the image capture unit captures an image with an exposure parameter higher than the exposure parameter threshold.

Preferably, the electronic device further includes a light intensity detector unit 84 configured to detect an ambient light intensity value of the electronic device; and a first adjusting unit 85 configured to adjust a light sensitivity of the image capture unit based on the ambient light intensity value of the electronic device, such that the image capture unit captures an image with the light sensitivity.

It can be appreciated by those skilled in the art that the functions implemented by the respective units of the electronic device can be understood by referring to the description associated with the above data processing method. The functions of the respective units of the electronic device can be implemented with programs running on a processor or with specific logic circuits.

Figure 9:
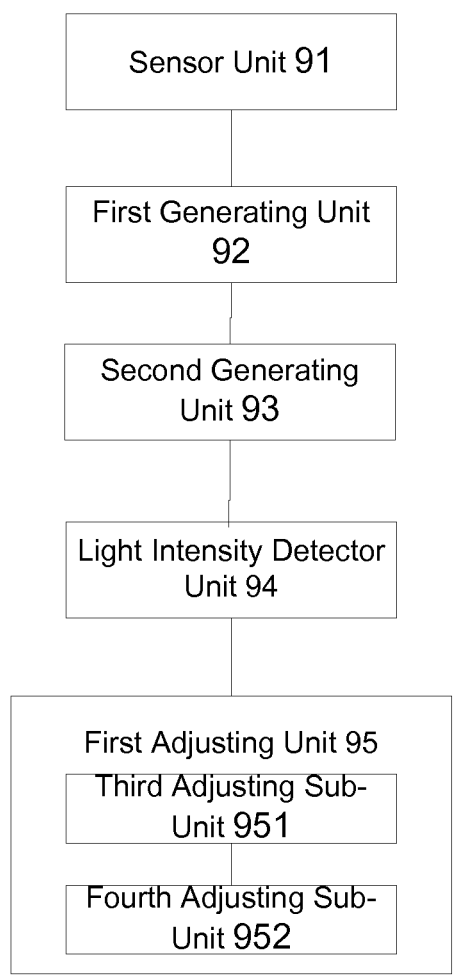
FIG. 9 is a block diagram showing a structure of an electronic device according to a fourth embodiment of the present application.

FIG. 9 is a block diagram showing a structure of an electronic device according to a fourth embodiment of the present application. The electronic device includes the following units.

A sensor unit 91 is configured to detect a movement status of the electronic device.

A first generating unit 92 is configured to generate a movement parameter of the electronic device based on the movement status.

A second generating unit 93 is configured to generate an exposure parameter threshold for an image capture unit of the electronic device based on the movement parameter of the electronic device, such that the image capture unit captures an image with an exposure parameter higher than the exposure parameter threshold.

Preferably, the electronic device further includes a light intensity detector unit 94 configured to detect an ambient light intensity value of the electronic device; and a first adjusting unit 95 configured to adjust a light sensitivity of the image capture unit based on the ambient light intensity value of the electronic device, such that the image capture unit captures an image with the light sensitivity.

Preferably, the first adjusting unit 95 includes a third adjusting sub-unit 951 configured to increase the light sensitivity of the image capture unit when the ambient light intensity value of the electronic device indicates that the ambient light intensity of the electronic device becomes brighter; and a fourth adjusting sub-unit 952 configured to decrease the light sensitivity of the image capture unit when the ambient light intensity value of the electronic device indicates that the ambient light intensity of the electronic device becomes darker.

It can be appreciated by those skilled in the art that the functions implemented by the respective units of the electronic device can be understood by referring to the description associated with the above data processing method. The functions of the respective units of the electronic device can be implemented with programs running on a processor or with specific logic circuits.

Figure 10:
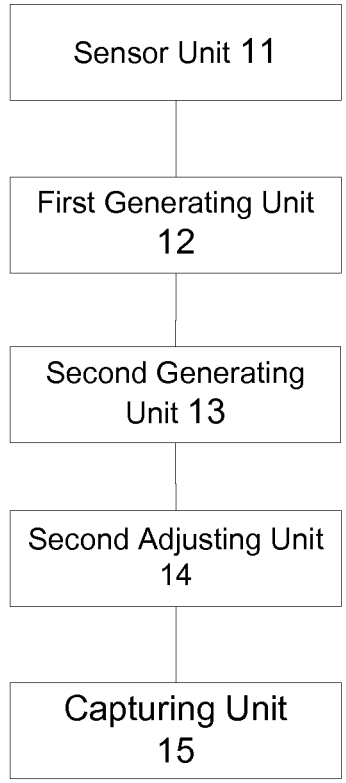
FIG. 10 is a block diagram showing a structure of an electronic device according to a fifth embodiment of the present application.

FIG. 10 is a block diagram showing a structure of an electronic device according to a fifth embodiment of the present application. The electronic device includes the following units.

A sensor unit 11 is configured to detect a movement status of the electronic device.

A first generating unit 12 is configured to generate a movement parameter of the electronic device based on the movement status.

A second generating unit 13 is configured to generate an exposure parameter threshold for an image capture unit of the electronic device based on the movement parameter of the electronic device, such that the image capture unit captures an image with an exposure parameter higher than the exposure parameter threshold.

Preferably, the electronic device further includes a second adjusting unit 14 configured to increase the exposure parameter for the image capture unit to be higher than the exposure parameter threshold; and a capturing unit 15 configured to capture, when the image capture unit is capturing a video of a subject, each frame of the subject with the exposure parameter.

It can be appreciated by those skilled in the art that the functions implemented by the respective units of the electronic device can be understood by referring to the description associated with the above data processing method. The functions of the respective units of the electronic device can be implemented with programs running on a processor or with specific logic circuits.

The solutions according to the embodiments of the present application can be combined arbitrarily, provided that they do not conflict.

It can be appreciated from the embodiments of the present application that the disclosed device and method can be implemented in alternative ways. The device embodiments as described above are illustrative only. For example, while the units have been divided in accordance with their logical functions, other divisions are possible in practice. For example, more than one unit or element can be combined or can be integrated into another system, or some features can be ignored or omitted. In addition, the coupling, direct coupling or communicative connection between various components as shown or discussed can be an indirect coupling or communicative connection via some interface, device or unit and can be electrical, mechanical or in another form.

The units described above as separated may or may not be physically separated. The components shown as units may or may not be physical units. They can be co-located or can be distributed over a number of network elements. Depending on actual requirements, some or all of the units can be selected to achieve the object of the present application.

Further, all the functional units in various embodiments of the present application can be integrated within one processing unit, or each of these units can be a separate unit, or two or more units can be integrated into one unit. Such integrated unit can be implemented in hardware, possibly in combination with software functional units.

While the embodiments of the present application have been described above, the scope of the present application is not limited thereto. Various modifications and alternatives can be made by those skilled in the art without departing from the scope of the present disclosure. These modifications and alternatives are to be encompassed by the scope of the present application which is only defined by the claims as attached.

What is claimed is:

1. A data processing method, applied in an electronic device, comprising:
   detecting a movement status of the electronic device by a sensor unit;
   generating a movement parameter of the electronic device based on the movement status, and
   generating an exposure parameter threshold for an image capture unit of the electronic device based on the movement parameter of the electronic device, such that the image capture unit captures an image with an exposure parameter higher than the exposure parameter threshold.

2. The method of claim 1, wherein said generating the exposure parameter threshold for the electronic device based on the movement status comprises:
   decreasing the exposure parameter threshold for the image capture unit of the electronic device when the movement parameter of the electronic device indicates that a moving speed of the electronic device increases; and
   increasing the exposure parameter threshold for the image capture unit of the electronic device when the movement parameter of the electronic device indicates that the moving speed of the electronic device decreases.

3. The method of claim 1, further comprising:
   detecting an ambient light intensity value of the electronic device by a light intensity detector unit; and
   adjusting a light sensitivity of the image capture unit based on the ambient light intensity value of the electronic device, such that the image capture unit captures an image with the light sensitivity.

4. The method of claim 3, wherein said adjusting the light sensitivity of the image capture unit based on the ambient light intensity value of the electronic device comprises:
   increasing the light sensitivity of the image capture unit when the ambient light intensity value of the electronic device indicates that the ambient light intensity of the electronic device becomes brighter; and
   decreasing the light sensitivity of the image capture unit when the ambient light intensity value of the electronic device indicates that the ambient light intensity of the electronic device becomes darker.

5. The method of claim 1, further comprising, when the image capture unit is capturing a video of a subject:
   increasing the exposure parameter for the image capture unit to be higher than the exposure parameter threshold; and
   capturing each frame of the subject with the exposure parameter using the image capture unit.

* * * * *